Aug. 6, 1963 J. J. NEFF 3,100,071

TAPE CLAMPING ROLLER ASSEMBLY

Filed Aug. 13, 1959 4 Sheets-Sheet 1

INVENTOR
JOSEPH J. NEFF
BY Flehr & Swain
ATTORNEY

INVENTOR.
JOSEPH J. NEFF
BY Flehr & Swain
ATTORNEYS

Aug. 6, 1963 J. J. NEFF 3,100,071

TAPE CLAMPING ROLLER ASSEMBLY

Filed Aug. 13, 1959 4 Sheets-Sheet 3

INVENTOR.
JOSEPH J. NEFF
BY Flehr and Swain
ATTORNEYS

INVENTOR.
JOSEPH J. NEFF
BY
ATTORNEYS

United States Patent Office 3,100,071

Patented Aug. 6, 1963

3,100,071

TAPE CLAMPING ROLLER ASSEMBLY

Joseph J. Neff, Los Altos, Calif., assignor to Ampex Corporation, Redwood City, Calif., a corporation of California Filed Aug. 13, 1959, Ser. No. 833,481
4 Claims. (Cl. 226—176)

This invention relates generally to a tape clamping roller assembly of the type employed in magnetic tape apparatus.

In prior art apparatus, the clamping or capstan idler roller is generally held by a pinch roller arm which is rotatably supported by a yoke. The yoke is directly mounted on a pivot shaft which extends through the top plate. Actuating means are provided below the top plate to rotate the pivot shaft to bring the roller into and out of engagement with the magnetic tape in response to control signals.

The pivot shaft is supported only over a small portion of its length, and consequently it may tend to flex when the clamping roller is brought into engagement with the tape. This may introduce tape speed variations or tape skew.

It is an object of the present invention to provide an improved clamping roller assembly.

It is a further object of the present invention to provide a clamping roller assembly in which the yoke is carried by a bushing which receives the pivot shaft.

It is a further object of the present invention to provide a clamping roller assembly which includes an improved drive means.

It is another object of the present invention to provide a capstan roller assembly including a drive means which is adapted to lock the roller against the capstan.

These and other objects of the invention will become more clearly apparent from the following description when taken in conjunction with the accompanying drawing.

Referring to the drawing.

Figure 1:
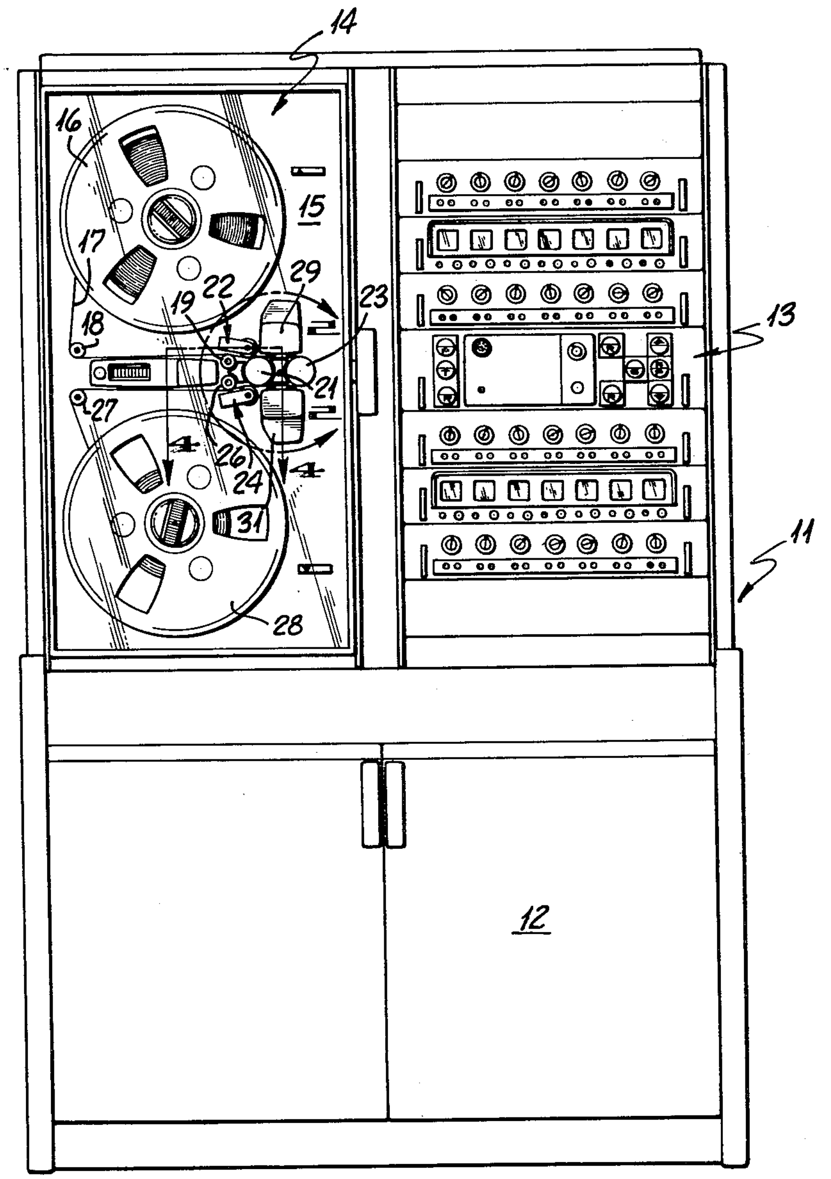
FIGURE 1 is an elevational view of a magnetic tape apparatus incorporating the present invention.

Referring to the drawing, the magnetic tape apparatus illustrated includes a housing 11 having a cabinet 12. The electronic controls, recording amplifiers and the like 13 are carried in the upper right-hand portion of the housing. The tape transport assembly 14 is shown carried in the upper left-hand portion of the cabinet.

The tape transport assembly includes a top plate 15 which supports supply reel 16 and take-up reel 28. The magnetic tape 17 extends from the supply reel over a guide post 18, past an idler 19, and thence over the capstan 21. A clamping roller assembly 22 in accordance with the invention is adapted to clamp the tape against the capstan 21, as will be presently described. The tape then travels over a turn-around idler 23, back over the capstan 21. A clamping roller assembly 24 clamps this portion of the tape against the capstan. The tape then passes over an idler 26, a guide post 27, and is wound onto the take-up reel 28. Magnetic heads 29 and 31 are disposed to engage the portion of the magnetic tape extending between the capstan and turn-about roller.

Figure 4:
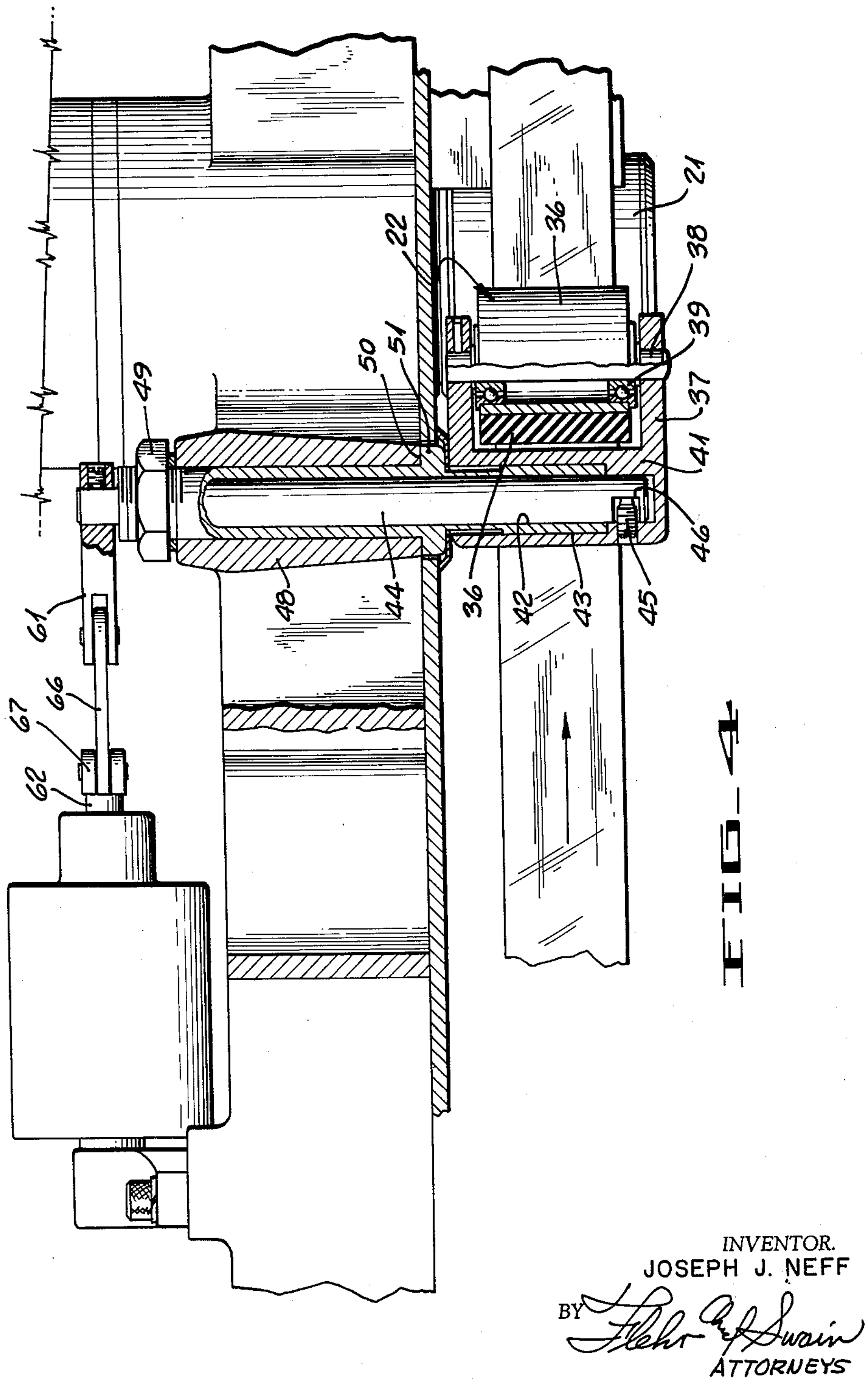
FIGURE 4 is a sectional view taken along the line 4—4 of FIGURE 1.

Referring particularly to FIGURE 4, the clamping roller assembly includes a clamping roller 36 rotatably mounted on a yoke 37 by the pin 38 and bearings 39. The closed end 41 of the yoke is bored at 42 and rotatably mounted on a bushing 43. A pivot shaft 44 extends through the bushing and engages the yoke portion 41. Set screws 45 are threadably received by the yoke. The ends of the screws are in abutment with the flat surface 46 formed on the shaft.

Figures 2, 3:
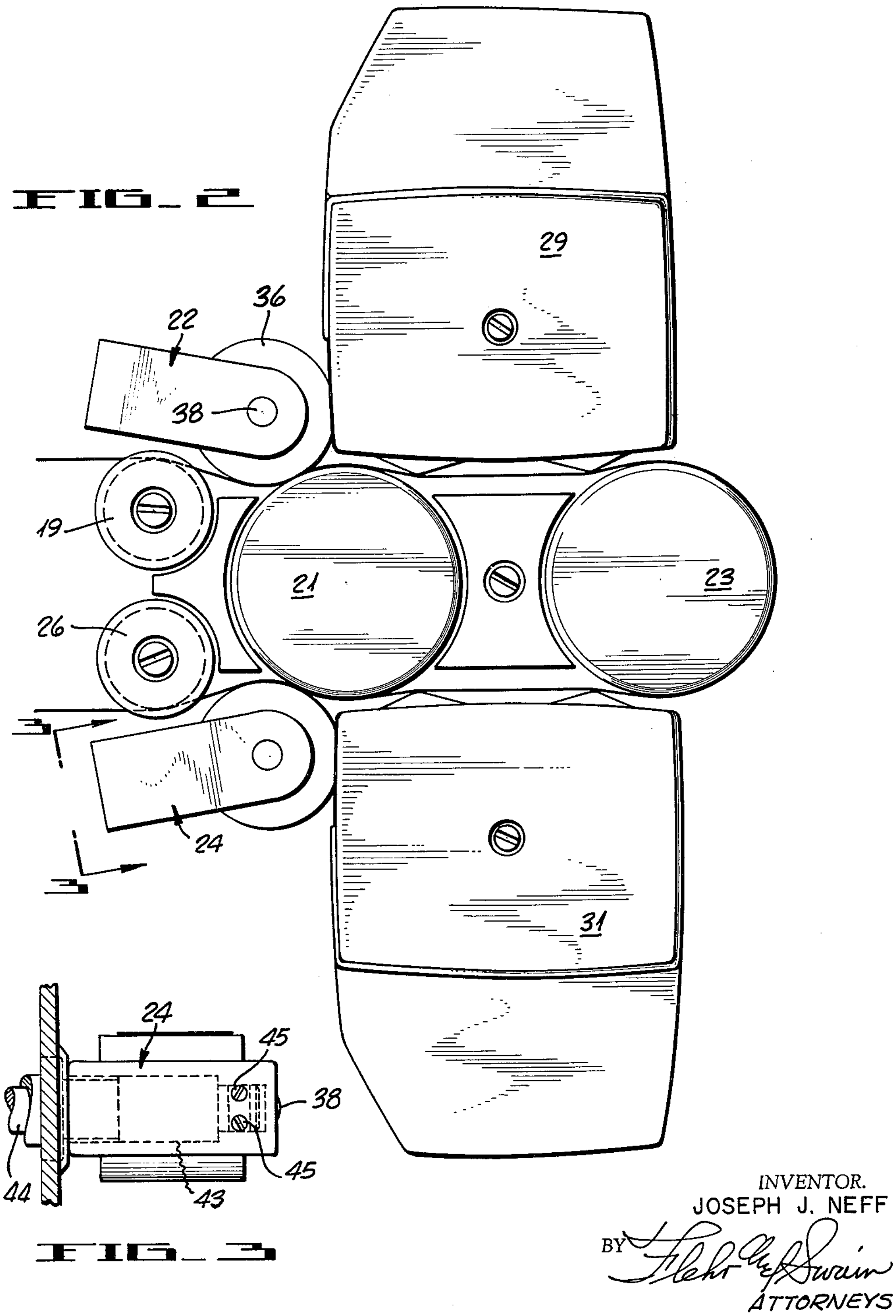
FIGURE 2 is an enlarged view of the portion of the apparatus within the curved line 2—2 of FIGURE 1.
FIGURE 3 is a view taken along the line 3—3 of FIGURE 2.

Referring particularly to FIGURE 3, it is seen that a pair of spaced screws 45 are provided. Thus, by adjustment of the two screws, the orientation of the yoke on the shaft 44 may be adjusted to control the amount of pressure between the clamping roller and the capstan.

The bushing 43 is supported within a housing 48 (see FIGURE 4) which forms a part of the top plate 15. A nut 49 is secured to the other end of the bushing 43 and serves to securely hold the bushing within the housing 48. By tightening the nut, the shoulder 50 formed on the bushing ring 51 abuts the housing and the bushing is securely held in place. It is seen that the bushing 43 serves to rotatably support the yoke in exact alignment. The pivot shaft is employed primarily to pivot the yoke and not support the same although it may add some support for the protruding end of the bushing.

Figure 5:
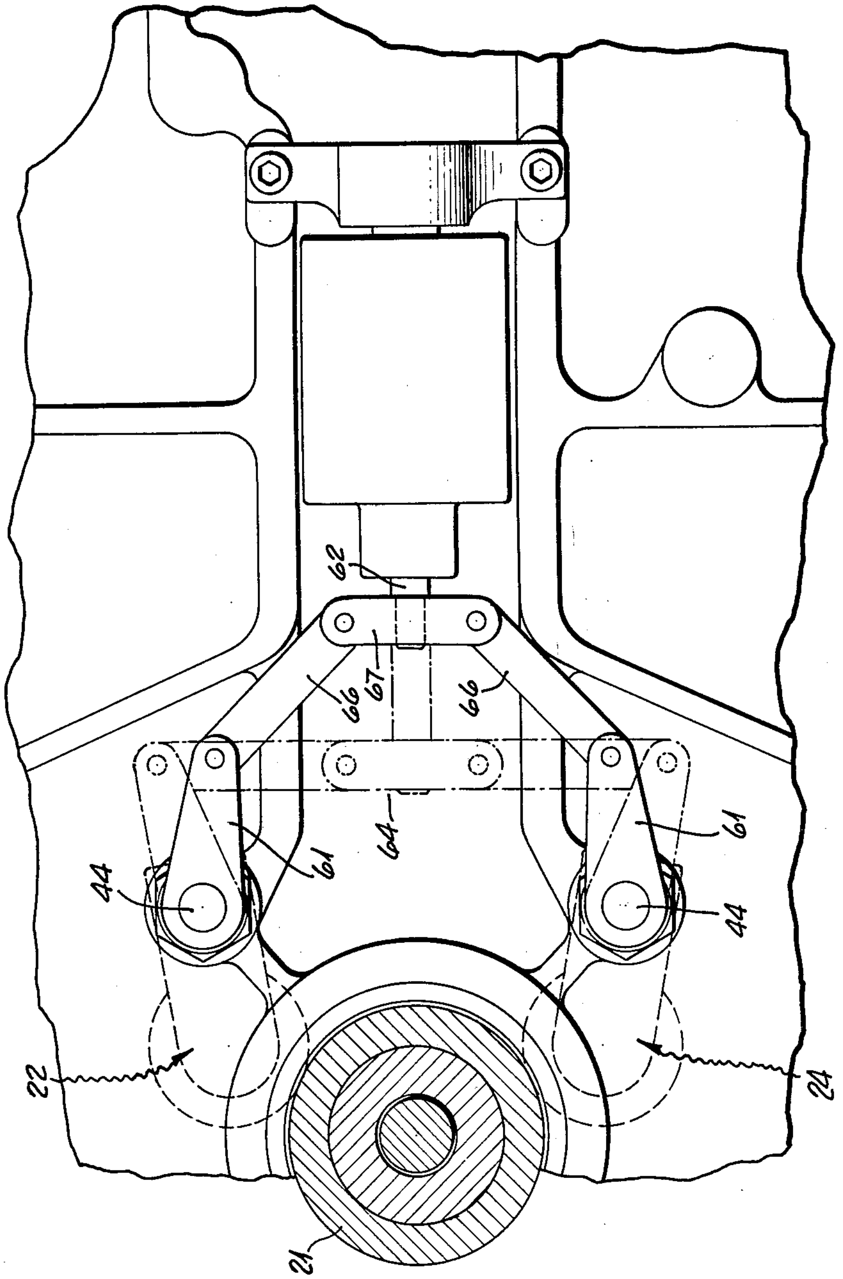
FIGURE 5 is a plan view showing the clamping roller assembly drive.

Referring to FIGURE 5, the lower ends of the shafts 44 of the spaced clamping roller assemblies 22 and 24 are pivoted by a crank 61. An air actuated piston (not shown) may drive the shaft 62 which is moved outwardly until it reaches the position shown by the dotted lines 64. The shaft 62 is secured to links 66 by a cross member 67. The parts are so selected that when the piston is energized, the cross links 66 and cross member 67 are aligned to form a brace which locks the cranks in the position shown in dotted line.

As previously described the pressure between the clamping roller and capstan may be regulated by adjustment of the screws 45. Once this adjustment has been made, actuation of the apparatus will always result in the same amount of roller to capstan pressure. The resilient surfaces of the roller and adjacent capstan afford a slight amount of compliance.

I claim:

1. A capstan roller assembly comprising: a clamping roller; a yoke rotatably supporting said clamping roller; a pivot shaft extending through said yoke parallel to the axis of said roller and coupled to said yoke for turning said yoke upon turning of said shaft; means for rotating said shaft for clamping and unclamping said roller; and means for adjusting the angular position of said yoke with respect to said pivot shaft.

2. A capstan roller assembly comprising: a clamping roller; a yoke rotatably supporting said clamping roller; a pivot shaft extending through said yoke parallel to the axis of said roller, said shaft having a flat formed on a portion lying within said yoke; and a pair of set-screws threaded through said yoke and bearing against said flat, said set-screws lying in a plane normal to the axis of said shaft, whereby the angular position of said yoke with respect to said shaft is adjustable.

3. A clamping roller assembly for a capstan comprising first and second spaced clamping rollers each carried on a yoke on opposite sides of said capstan, a pivot shaft coupled at one end to each of said yokes, a drive crank secured to the other end of each of said shafts, drive means for each of said cranks, each of said drive means including a link having one end pivotally mounted on a respective one of said cranks, and means for driving said links whereby said cranks are urged outwardly from one another and the links aligned to lock the cranks in place with said rollers clamped against said capstan.

4. A magnetic tape apparatus including a top plate, a capstan mounted on said top plate, first and second spaced bushings mounted on said top plate on opposite sides of said capstan, first and second yokes rotatably mounted on said bushings and each supporting a clamping roller, a pivot shaft extending through each of said bushings, each pivot shaft being respectively coupled at one end to a respective one of said yokes, a crank arm secured to the other end of each pivot shaft, drive means for each of said crank arms, each of said drive means including a link having one end pivotally mounted on a respective one of said crank arms, means for driving said links whereby the crank arms are urged outwardly until the links align to lock the crank arms in place with said rollers clamped against said capstan; and means for adjusting the angular position of each yoke with respect to the corresponding pivot shaft to change the pressure of said rollers against said capstan.

References Cited in the file of this patent

UNITED STATES PATENTS

| | | |
|---|---|---|
| 2,073,224 | Ross | Mar. 9, 1937 |
| 2,669,398 | Olson | Feb. 16, 1954 |
| 2,679,800 | Lofquist | June 1, 1954 |
| 2,757,554 | Niedhammer et al. | Aug. 7, 1956 |
| 2,792,217 | Weidenhammer et al. | May 14, 1957 |
| 2,833,538 | Namenyi-Katz | May 6, 1958 |
| 2,909,337 | Lahti et al. | Oct. 20, 1959 |